No. 748,322. PATENTED DEC. 29, 1903.
R. P. TISCH & R. KISSINGER.
TROLLEY DEVICE.
APPLICATION FILED MAY 23, 1903.
NO MODEL.

Witnesses
C. H. Johnson
H. J. Shepard

Robert Kissinger } Inventors
Ralph P. Tisch
C. C. Shepherd
Attorney

THE NORRIS PETERS CO., PHOTO-LITHO., WASHINGTON, D. C.

No. 748,322. Patented December 29, 1903.

UNITED STATES PATENT OFFICE.

RALPH P. TISCH AND ROBERT KISSINGER, OF HEBRON, OHIO; SAID KISSINGER ASSIGNOR TO SAID TISCH AND CHARLES A. PENCE, OF HEBRON, OHIO.

TROLLEY DEVICE.

SPECIFICATION forming part of Letters Patent No. 748,322, dated December 29, 1903.

Application filed May 23, 1903. Serial No. 158,426. (No model.)

*To all whom it may concern:*

Be it known that we, RALPH P. TISCH and ROBERT KISSINGER, citizens of the United States, residing at Hebron, in the county of Licking and State of Ohio, have invented a certain new and useful Improvement in Trolley Devices, of which the following is a specification.

This invention relates to trolley devices for electric railways, and is particularly designed to provide improvements in the mounting of trolley-wheels with respect to the harps of trolley-poles and also to provide an improved connection between the poles and the harps.

It is furthermore designed to provide for conveniently taking up wear in the bearings of the trolley-wheel and to accomplish this result in either bearing independently of the other.

Another object is to obviate weakening of the trolley-pole by the formation of openings therethrough for the reception of fastenings and also to obviate screw-threads upon the trolley-pole.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
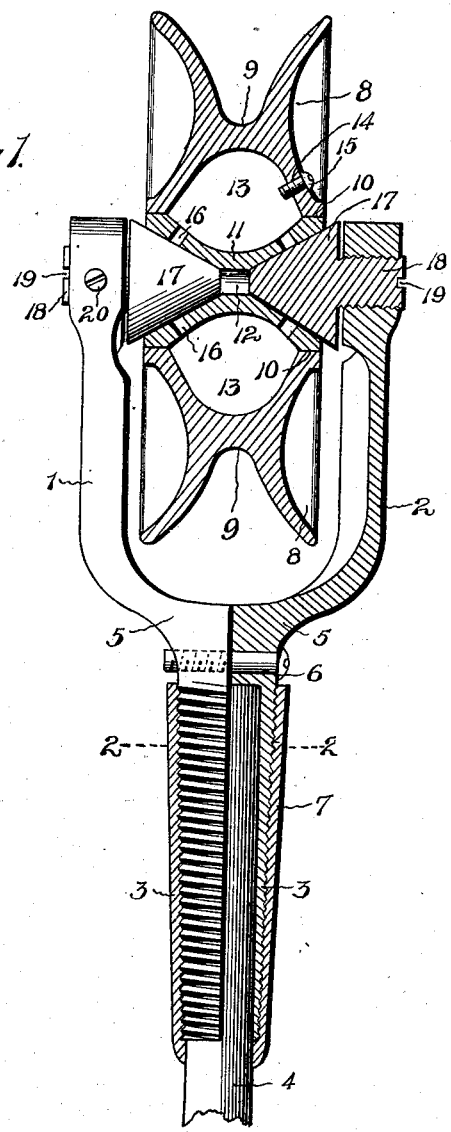
Figure 2:
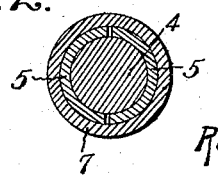

In the drawings, Figure 1 is a view, partly in longitudinal section and partly in elevation, of a trolley device constructed and arranged in accordance with the present invention; and Fig. 2 is a sectional view on the line 2 2 of Fig. 1.

Like characters of reference designate corresponding parts in both figures of the drawings.

As is customary in overhead trolley devices, this device embodies a yoke-shaped bracket or harp, in the present instance made up of duplicate longitudinal sections 1 and 2, of which the section 1 has been shown in elevation, while the other has been shown in section. Each section has the usual fork member and a shank member 3, the latter being semitubular in shape and conical or tapered toward its lower end, the interior of the member being smooth and its exterior being screw-threaded. When the two sections are brought together in their normal positions, the shank or stem members coöperate to form a socket for the reception of the upper end of the pole 4, which abuts against the solid upper-end portions 5 of the shanks, which close the upper end of the socket. Prior to assembling the pole and the harp a screw 6 is inserted in the corresponding openings that pierce the shank or stem members through the solid upper ends thereof, one of these openings being screw-threaded to receive the screw-threaded part of the screw and the other opening being smooth, whereby the harp-section having the smooth opening may be adjusted toward and away from the other upon the screw without loosening the latter. The purpose of this screw is to temporarily connect the harp-sections prior to and during the assembling of the trolley-pole and the harp. To rigidly secure the harp to the pole, an internally-screw-threaded tapered clamping-sleeve 7 embraces the shank or stem members 3, whereby the shank members may be drawn into snug engagement with the pole by turning the sleeve to feed upwardly. By this connection between the harp and the pole the former may be conveniently fitted to any ordinary trolley-pole without screw-threading the latter, and it is not necessary to weaken the pole by the formation of openings therethrough. Furthermore, the harp may be conveniently removed and replaced without separating the sections, and the sections may be separated to take out the trolley-wheel whenever desired.

The trolley-wheel 8 has the usual or any preferred form of peripheral groove 9 for the reception of a trolley-wire and is also provided with a central axial opening 10 for the reception of a bearing-sleeve or hub 11, the opposite end portions of which are internally tapered inwardly to form conical bearing-openings which communicate with one another at their inner ends through the medium of a small axial passage 12. The central opening 10 of the trolley-wheel is intermediately enlarged to form an internal annular chamber 13 for containing a lubricant, access being had to this chamber for the introduction of the lubricant through an opening 14, formed in one face of the wheel, there being a suitable screw-threaded closure-plug 15 normally fitted in the opening to prevent escape of the lubricant and to obviate ingress of foreign matter. Communication is had from the oil-chamber 13 to the conical bearing-socket portions of the hub 11 through openings 16, formed through said hub.

For supporting the trolley-wheel upon and between the fork members of the harp there are provided opposite reversely-disposed trunnions, each of which consists of a conical head 17, fitting the adjacent conical socket of the hub or bearing-sleeve 11 and having an integral reduced externally-screw-threaded stem 18 adjustably fitted into a screw-threaded opening in the upper end of the adjacent fork member, the outer end of the stem having a diametric groove or seat 19 for the reception of a screw-driver to turn the trunnion, and thereby feed the latter inwardly to take up wear in the bearing. After each trunnion has been properly adjusted it may be locked against accidental turning by means of a set-screw 20, which pierces the fork and intersects the screw-threaded opening thereof to impinge against the stem of the trunnion and thereby hold the same against turning. A very important feature of the invention will now be understood—that is to say, each trunnion is adjustable independently of the other, and therefore either or both trunnions may be adjusted to take up wear or to properly center the wheel.

The importance of the adjustable feature of the trunnions is further emphasized by the fact that in a sectional harp the distance between the fork members thereof cannot always be maintained at a predetermined interval. Wherefore it is apparent that there is an interdependence between the sectional feature of the harp and the adjustable feature of the trunnions.

Having thus described the invention, what is claimed, and desired to be secured by Letters Patent, is—

1. In a trolley device, a harp formed in opposite longitudinal sections having tapered semitubular shank portions which are externally screw-threaded, the interior of the combined shank-sections forming a socket for the reception of a trolley-pole, and an internally-screw-threaded tapered clamping-sleeve fitted to the screw-threaded portions of the shank members.

2. In a trolley device, a harp formed in opposite longitudinal sections having tapered externally-screw-threaded semitubular shank portions to receive a trolley-pole, the upper ends of the shank portions being provided with corresponding openings, one of which is smooth and the other screw-threaded, a screw fitted in the opening with its screw-threaded portion engaging the screw-threads of one of the openings and loosely received within the other opening, and a tapered internally-screw-threaded clamping-sleeve embracing the screw-threaded shank portions of the harp members.

3. In a trolley device, a harp formed in opposite longitudinal members having tapered semitubular shank portions which combine to form a socket for the reception of a trolley-pole, and an endwise-adjustable tapered clamping-sleeve embracing the shank portions.

4. In a trolley device, a harp formed in opposite longitudinal members having tapered semitubular shank portions which combine to form a socket for the reception of a trolley-pole, the upper ends of the shank portions being provided with corresponding openings, one of which is smooth and the other screw-threaded, a screw to fit loosely in the smooth opening and engage the threads of the other opening, and an endwise-adjustable tapered clamping-sleeve embracing the shank portion.

RALPH P. TISCH.
ROBT. KISSINGER.

In presence of—
C. A. SWISHER,
O. M. KRAMER.